May 16, 1933.  A. M. SKELLETT  1,909,842
METHOD AND MEANS FOR MEASURING DIRECT CAPACITY
Filed March 15, 1932  3 Sheets-Sheet 1
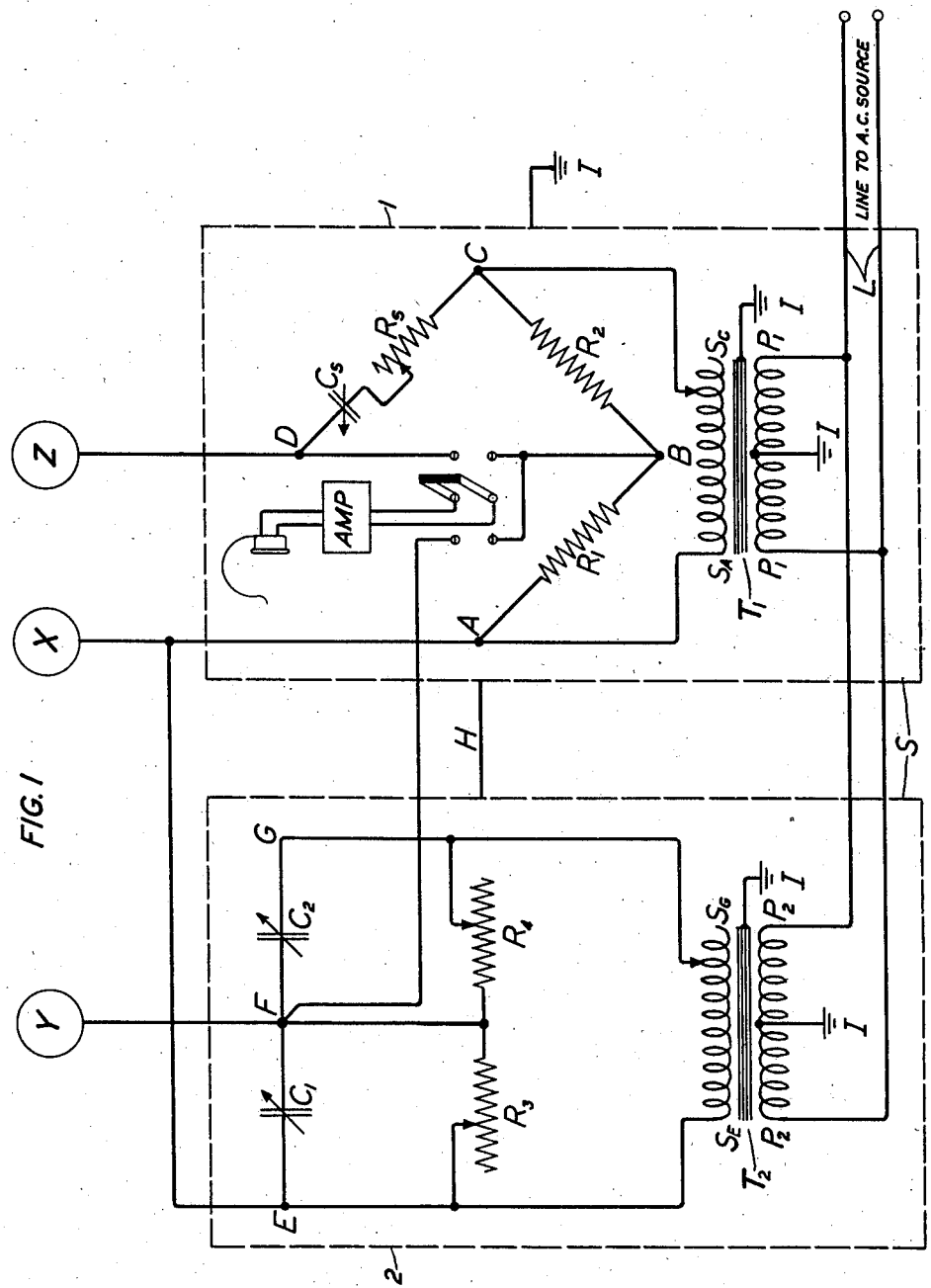
INVENTOR
*A. M. SKELLETT*
BY  *E. V. Griggs*
ATTORNEY

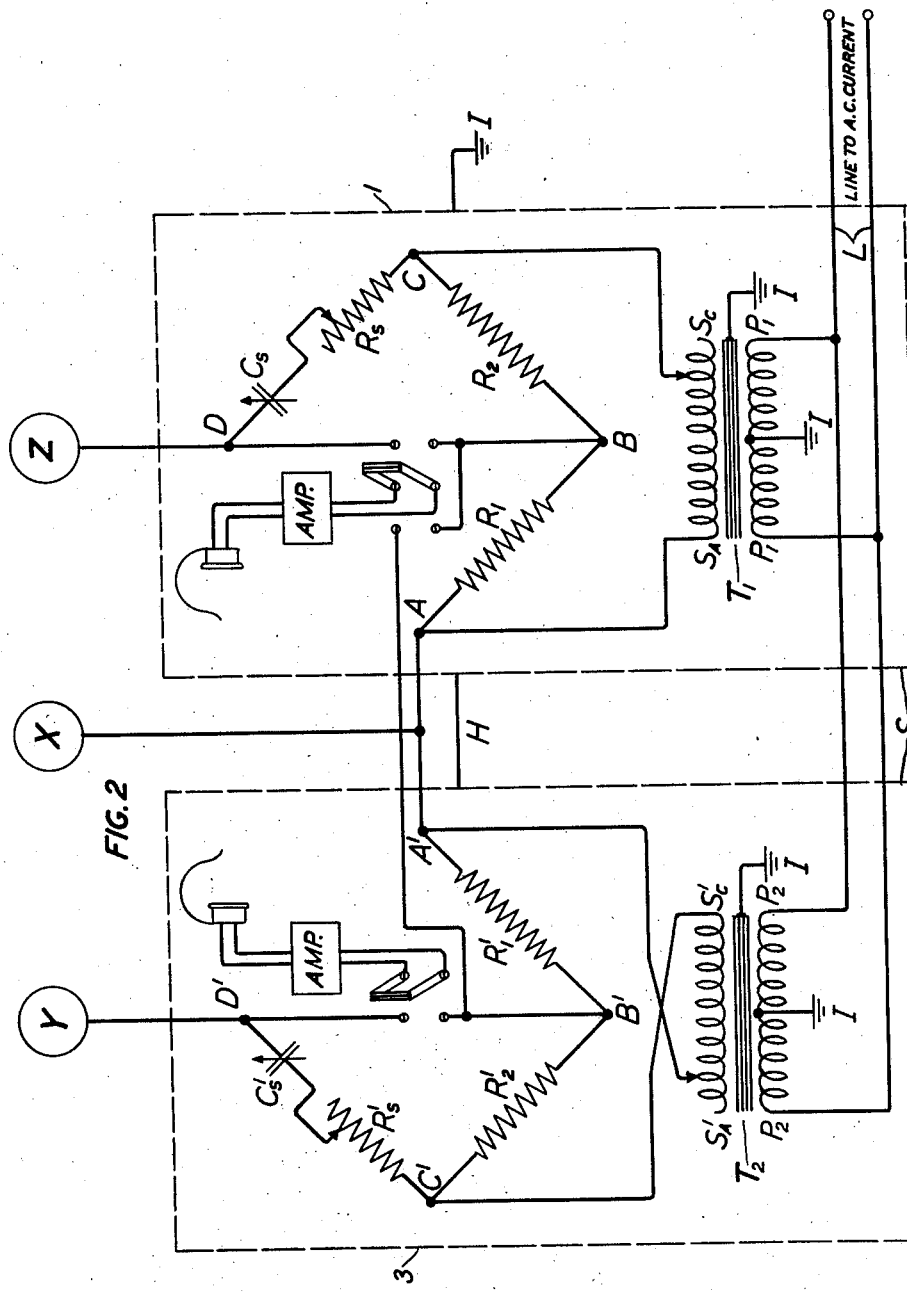

May 16, 1933.  A. M. SKELLETT  1,909,842
METHOD AND MEANS FOR MEASURING DIRECT CAPACITY
Filed March 15, 1932   3 Sheets-Sheet 3
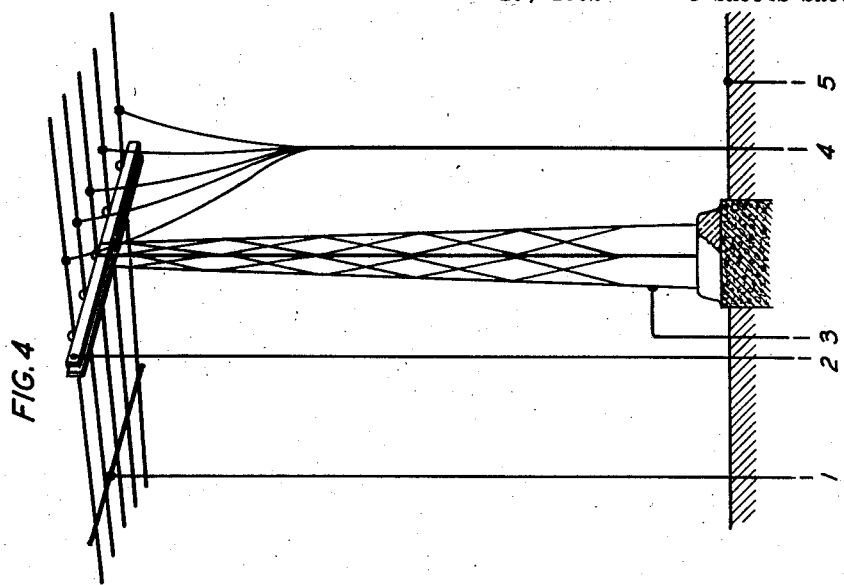
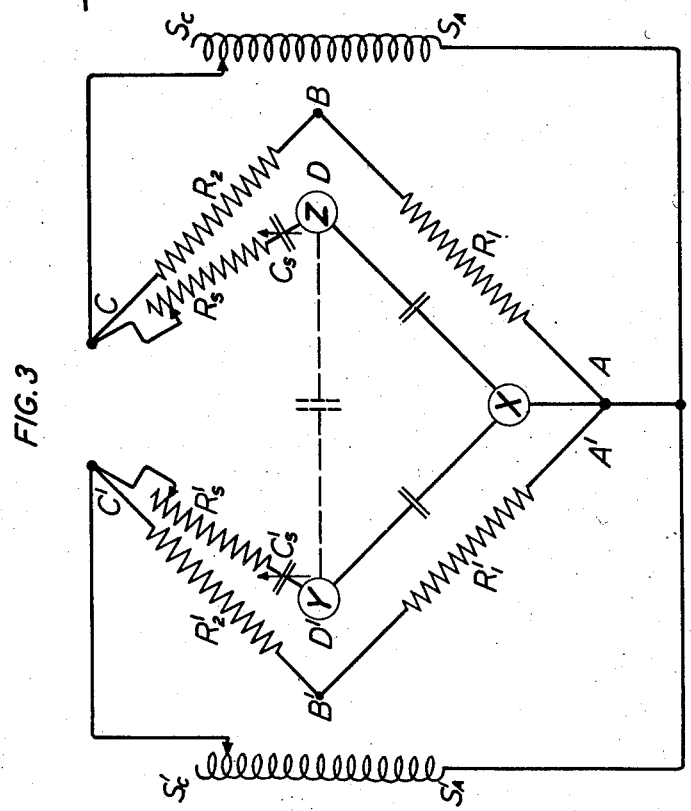
INVENTOR
A. M. SKELLETT
BY
E. V. Griggs
ATTORNEY Patented May 16, 1933

1,909,842

UNITED STATES PATENT OFFICE

ALBERT M. SKELLETT, OF ASBURY PARK, NEW JERSEY, ASSIGNOR TO BELL TELEPHONE LABORATORIES, INCORPORATED, OF NEW YORK, N. Y., A CORPORATION OF NEW YORK

METHOD AND MEANS FOR MEASURING DIRECT CAPACITY

Application filed March 15, 1932. Serial No. 598,975.

This invention relates to the measurement of capacity and particularly to means and methods for the measurement of component direct capacity.

Measurement of capacities in a system of conducting elements often presents the problem of measuring capacities which it is quite difficult, if not impossible, to isolate. The component direct capacities must be measured just as they occur in association with other capacities, whose values may be much larger than the particular direct capacity which it is necessary to accurately measure. This renders desirable a method and means for measuring such component direct capacities as distinguished from ordinary capacity measurements where isolation of the desired capacity is secured or assumed.

According to this invention in measurement of a component capacity in a system of conducting elements between which capacities exist, the shunting effects of other capacities in the system are eliminated by maintaining all elements not directly in the measurement at the same potential as one of the elements associated with the component capacity being measured.

The invention is not limited in application and may be used generally where component direct capacities are required. It may be used in measurement of capacity between an antenna, its supporting tower and ground, in measurement of inter-electrode capacities of vacuum tubes, in measurement of stray capacities, in the determination of dielectric constants by Kelvin's guard ring method, etc.

In a closely associated system of three elements, for example, such as X, Y and Z, let it be assumed that Y and Z are ordinarily connected together but that the components of the capacity associated with X are desired, that is, the values of the capacity of X to Y and of X to Z are desired. Obviously the capacity of X to Z cannot be measured by disconnecting Y and measuring the capacity of X to Z by the usual Wheatstone bridge circuit employed in measurement of isolated capacities. The shunt capacity, Z to Y to X would be present and the capacity reading obtained would not be the true value of X to Z capacity which would be obtained if the bodies X and Z were isolated. To permit accurate measurement, it is necessary to eliminate the shunt path Z to Y to X and, in effect, to isolate the bodies X and Z, as far as capacity considerations are concerned. In this invention this is done by maintaining Y at the same potential as Z, both as to magnitude and phase, without direct connection, while measurement is being made. When this condition exists there can be no voltage difference between Y and Z. The shunt path Z to Y to X is, effectively, open-circuited and the component capacity X to Z may now be measured by means of the Wheatstone bridge circuit which is usually employed to measure isolated capacities.

The method of accomplishing this is shown in the drawings, in which:

Fig. 1 shows the general method and a circut for correctly measuring the direct capacity between two of three closely associated bodies;

Fig. 2 shows a modification of the circuit of Fig. 1;

Fig. 3 shows a modified circuit drawing of Fig. 2 for purposes of illustration; and Fig. 4 schematically shows the application of the general method to the measurement of the component capacities of an antenna system.

In Fig. 1, X, Y and Z are the component capacities to which reference is made in the example above. As shown, the component capacity X to Z is being measured and Y is being maintained in phase with Z at the same potential. 1 constitutes a bridge of the usual sort for measuring capacity, the capacity to be measured being connected between terminals A and D and the measurement made by adjustment of the variable capacity $C_s$ and the variable resistance $R_s$ in the CD branch of the bridge circuit. The remaining branches of the bridge circuit AB and BC are matched resistances $R_1$ and $R_2$ of suitable value. The bridge network, A B C D is supplied with an alternating electromotive force through the secondary of a transformer $T_1$ whose primary $P_1$—$P_1$ is connected to the line L which, in turn, is connected to a source of alternating current electromotive force.

2 constitutes a network by means of which the method of this invention may be accomplished. This network is made up of two resistances and two condensers $R_3$, $R_4$, $C_1$ and $C_2$, respectively, as shown. A transformer $T_2$ similar in all effects to $T_1$, which supplies the bridge 1, is arranged to supply unit 2. The lead $S_A$ from the secondary of $T_1$ is connected to the corresponding lead $S_E$ of the secondary of $T_2$, shown as the connection A to E. Since the transformers $T_1$ and $T_2$ are similar in all respects, the remaining secondary leads, $S_C$ and $S_G$, are at all times at the same potential and in phase. For any point between A and C there is a corresponding point at the same potential between E and G, both as to magnitude and phase. In the event that the transformers are not identical, voltage regulating means may be provided for exactly matching the outputs from the secondaries, $S_A$—$S_C$ and $S_E$—$S_G$, of the two transformers. For example, on the drawings, means are shown for varying the turns in the secondaries of the two transformers. Therefore, as shown, Y may be connected to the unit 2 so that it will be always at the same potential and in phase with Z when the elements $C_1$, $C_2$, and the resistances $R_3$, $R_4$, are set at suitable values. The remaining bodies involved in the measurement, namely, X and Z, are connected as shown in the AD branch of the bridge circuit.

In order to set the elements $C_1$, $C_2$, and $R_3$, $R_4$ at proper values to maintain Y at the potential of Z, the bridge 1 is balanced in the usual fashion, with the closely associated X, Y and Z capacities connected as shown in Fig. 1, by connecting phones, for example, through the usual amplifier between the points D and B; the unit 2 is then balanced against the bridge by adjustment of $C_1$ and $R_3$, with the phones connected between points F and B. Because of the equality of $R_1$ and $R_2$ of the bridge $R_3$ and $R_4$ are approximately equal. $R_4$ may be set approximately equal to $R_1 = R_2$, and $C_2$ may approximately equal the capacity to be measured. The bridge must be rebalanced after adjustment of the unit and the unit in turn balanced again because of the shunt paths between the bodies before Y and Z are made equipotential. However, two trials on each are usually all that are necessary for satisfactory balance conditions. The phones or other suitable balance detecting means, may be connected to a double-pole double-throw switch so that they may be connected either to D and B or to F and B as shown in Fig. 1. It is obvious that the phones might also be connected between F and D as well as between F and B.

When the bridge 1 and the unit 2 are balanced against each other Y is at the same potential and in phase with Z. The component capacities X to Y and Z to Y do not affect the measurement of the capacity X to Z and the magnitude of $C_3$ as determined in setting of the bridge in general may be taken as the value of the component X to Z capacity, as, in most cases the correction to be applied by reason of its losses, balanced by $R_S$, is negligible. From Fig. 1 it can be seen that the capacity X to Y is completely isolated from the bridge. In parallel with the bridge branch AD there is the possible circuit from D to Z, to Y, to F, through $C_1$ and $R_3$, to E and to A. This circuit, however, is "open" as far as the current is concerned because Y and Z are held at the same potential. There is no potential difference from Y to Z, hence no current flow. To prove experimentally that there is no shunt path Z to Y to X when this condition exists, a fixed condenser was connected across Y and Z thus altering their relationship and it was noted that no change resulted in the value measured for the capacity of X to Z.

Another check on the method and the most obvious one may be obtained by measuring the capacity from X to Z and adding it to that from X to Y. In Fig. 1 the connections for measurement of the component capacity X to Z are indicated; the component capacity X to Y may, of course, be obtained by reversing the position of Y and Z in Fig. 1. This sum should equal that obtained when the capacity between X and Y+Z is measured on the bridge alone in the usual way, Y+Z being the combination of Y and Z directly connected together. With a specific embodiment of this invention described below, this check was made for a number of measurements of component capacities and was always within experimental error, which in the particular instance was about 1 micro-microfarad in 500. With the set-up of Fig. 1 the balances on the bridge after adjustment of the unit 2 are as sharp as when the bridge is used alone. The accuracy of measurement of component capacities of closely associated bodies is therefore of the same order as that when the bridge alone is used.

In Fig. 2 is shown a modification of the invention in which the unit 2 of Fig. 1 has been replaced by another bridge 1, which is denoted in Fig. 2 by numeral 3. As in Fig. 1, the two similar transformers $T_1$ and $T_2$, connected in parallel to a line L leading to a source of alternating electromotive force, supply the same potential to the two units— in this case two similar bridges 1 and 3. As noted in connection with Fig. 1, means, such as secondary turns adjusters may be provided for exactly matching the outputs from the secondaries of the two transformers.

If the bridges were identical, only their balances would be necessary for measurement. Once the two were balanced against each other, Y and Z would always be in phase and at the same potential, provided that the outputs of the transformers $T_1$ and $T_2$ were exactly matched. By connecting phones, or other balance detecting means, to the points B and B' of the resistance arms of the two bridges, with X, Y and Z not connected in the system, the balance of the bridges may be checked. With the bridges balanced against each other, with the bodies X, Y and Z connected, and with phones, or other balance detecting devices, connected to points BD and B', D', respectively, as shown in Fig. 2, each bridge may be balanced by adjustment of the variable elements $C_S$, $R_S$ and $C'_S$, $R'_S$. The balanced setting of bridge 1 is the component capacity of X to Z, as is true in the arrangement of Fig. 1, and the setting of bridge 3 is the component capacity X to Y. If the bridges are not identical they must be balanced separately then balanced against each other and rebalanced until no appreciable change is indicated by the balance detecting means, when it is shifted from indicating the bridge balance to indicating the balance of the one bridge against the other. Measurements made in this manner may be checked as indicated in connection with Fig. 1, the sum of the component capacities of X to Y and of X to Z which are obtained being equal to the capacity of X to Y+Z, when Y and Z are directly connected. The latter capacity of X to Y+Z may be obtained by use of a single bridge in the usual manner of measurement of direct capacity. The substitution method may be used throughout measurements.

Shielding as indicated by the dotted lines F in Figs. 1 and 2 is important for accurate functioning of the invention but does not need to be elaborate for low frequencies. The shields are connected as indicated at H and the system grounded at points, I as shown in Figs. 1 and 2. In accordance with common practice the cores of the transformers $T_1$ and $T_2$ are grounded as well as the midpoints of the primary windings $P_1$—$P_1$, $P_2$—$P_2$.

In a specific embodiment of the invention of the sort shown in Fig. 1, the bridge 1 was a type No. 216 General Radio Company capacity bridge, the transformers $T_1$ and $T_2$ were both input transformers of this type bridge and were shielded. The resistances $R_3$ and $R_4$ of unit 2 were a decade box, $R_3 + R_4$ being 10,000 ohms which equalled the sum of the resistances $R_1$ and $R_2$ in the bridge. The capacities of condensers $C_1$ and $C_2$ are dependent upon the component capacities of the system which is to be measured and are of the same order of magnitude. $C_S$ and $R_S$ of the bridge 1 were the standard condenser and resistance with which the bridge is equipped. The frequency at which measurements were made with this specific example of the invention was 2500 cycles per second.

Fig. 3 is a rearrangement of the circuit of Fig. 2 for the purpose of showing that the bodies Y and Z can be maintained at the same potentials without direct connection, by application of this invention. The same reasoning is obviously applicable to the arrangement of Fig. 1 but is more readily applied to the circuit containing the two similar bridges. The windings $S_A$—$S_C$ and $S_{A'}$—$S_{C'}$ are the secondary windings of the transformers $T_1$ and $T_2$. As has been stated these windings may be adjusted by suitable means, for example, by varying the number of turns to have exactly matched output voltages. $S_A$ and $S_{A'}$, are connected at AA', and the points C' and C are at the same potential without direction connection. If $R_1 = R_2 = R'_1 = R'_2$, the points B and B' are at the same potential when X, Y and Z are not connected. The balance of the bridges against each other can be checked by connecting phones, for example, across B, B'. With X, Y and Z connected as shown and the phones of the bridges connected respectively across B, D and B', D', the variable elements $R_S$, $C_S$ and $R'_S$, $C'_S$ can be adjusted until balances are obtained. Several trial balances of each bridge may be necessary because of the effect of the shunt path Y to Z on each bridge balance until Y and Z are at the same potential. When the bridges are balanced, by simple Wheatstone bridge analysis D is at the potential of B and D' is at the potential of B'. It follows that the bodies Y and Z are at the same potential and the Y to Z shunt path is effectively open-circuited. The settings of $R_S$ and $C_S$ can be interpreted to be the capacity and resistance components of the impedance X to Z and the settings of $R'_S$ and $C'_S$ can in turn be interpreted to be the capacity and resistance components of the X to Y impedance. Except for the small dielectric loss of the standard condensers $C_S$ and $C'_S$ for which correction can be made, the settings of these condensers represent the component direct capacities of X to Y and X to Z.

Fig. 4 shows schematically the connection for measurement of component capacities of an antenna system. The invention was developed in connection with these measurements. Lead 1 is to the flat-top of the antenna, 2 is to the cross-arm, which, in practice, may be insulated from the tower upright 3 is to the tower upright which in practice may be insulated from ground, 4 is the usual down-lead from the antenna, and 5 is ground. For example, in the measurement of component capacities of an antenna system, referring to Figs. 1 and 2, X might be the flat-top of the antenna, (lead 1 of Fig. 4), Y the whole tower, (leads 2 and 3 of Fig. 4), Z the ground, (lead 5 of Fig. 4), for measurement of the flat-top-to-tower capacity; or X might be the down-lead 4, Y the flat-top 1, and Z the tower-and-ground 2, 3 and 5 for measurement of the down-lead-to-ground-and-tower capacity. As has been stated, the invention is not limited to antenna component capacity measurement, but is generally applicable for measurement of component direct capacities in any system of closely associated bodies between which capacity exists. The scope of the invention is defined in the following claims.

What is claimed is:

1. In a system of closely associated conducting elements, the method of effectively isolating any two elements and the capacity associated therewith which comprises subjecting all other elements to the potential of one of said two elements without direct connection thereto.

2. In combination with three closely associated bodies between which there is capacity, a source of alternating electromotive force, two transformers similar in all respects, the primary windings of which are connected in parallel to said source, the secondary windings of which are connected respectively to a Wheatstone bridge circuit and a variable network, and one of the leads of one of the secondary windings connected to the corresponding lead of the other secondary winding, two of said bodies connected in said bridge circuit so that capacity between them can be measured, the remaining of said bodies connected to said variable network, means to adjust said network so as to maintain the body connected thereto at the potential of one of said other two bodies, and means for detecting this condition.

3. Apparatus in accordance with claim 2, said two transformers being equipped with output voltage adjusting means.

4. Means for measuring the direct capacity of two conducting elements closely associated with a third conducting element which comprises a source of alternating electromotive force, the primary windings of two transformers connected in parallel thereto, means to exactly match the output of the secondary windings of each of said transformers, and each secondary winding connected respectively to each of two Wheatstone bridge circuits adapted to capacity measurement, two adjacent branches of which are matched resistances, a third branch being a series combination of a variable resistance unit and a variable capacity unit connected to one of said matched resistances, the fourth branch between said third branch and the other of said matched resistances being adapted for connection of a capacity whose value is desired, the ends of last mentioned of said matched resistances of the two bridges being connected, and one of said two conducting elements connected thereto, the other of said two conducting elements connected to the variable branch of one of said bridges and the third closely associated body connected to the corresponding branch of the other of said bridges, means to detect the balance of each bridge, and means to detect the condition that the bodies connected to the variable branches of the two bridges are at the same potential, and means to adequately shield said measuring means.

5. The method of measuring the component direct capacity between two bodies of a system of conducting bodies in proximity to one another which comprises impressing an electromotive force on all other bodies of the system such that their resulting potentials shall coincide in magnitude and phase with the potential of one of said two bodies, thus eliminating the capacity effect of said other bodies with respect to the second of said two bodies and thereupon measuring the resultant capacity between said two bodies.

6. The method of measuring the component capacity between any two elements of an antenna system, which comprises connecting said two elements in a network for measuring direct capacities, maintaining the remainder of said antenna system at the same voltage, both as to magnitude and phase, as that of one of said two elements, and measuring said component capacity with said network.

7. In combination, apparatus to accurately measure component direct capacities comprising a network adapted to measurement of direct capacities, a second network affording voltage adjusting means connected in parallel with said network to a source of alternating electromotive force, each network connected to said source through a transformer, means to determine a voltage in said second network of value and phase the same as the voltage at an accessible point in said first network.

8. The method of accurately measuring a component direct capacity between any two of a group of closely associated bodies between which capacity exists, which comprises maintaining all of said bodies except one of said two, at the potential of and in phase with the other of said two by means of electrical networks, and measuring said component direct capacity with a bridge suited for measurement of direct capacities.

9. In a system of intimately related conducting elements, means for measuring component direct capacities between any two elements of said system comprising two similar direct capacity bridges, each having two accessible points between which a desired direct capacity may be connected, supplied from a common source of alternating electromotive force through two similar transformers, means for connecting one of said two elements in common to one of said two accessible points in each bridge, means to connect the other of said two elements to the remaining accessible point of one bridge and to connect the remainder of said conducting elements to the remaining accessible point of said other bridge, and means to maintain and determine the condition that said remaining elements are at the potential of and in phase with the one of said two elements not common to the two bridges.

In witness whereof, I hereunto subscribe my name this 8th day of March, 1932.

ALBERT M. SKELLETT.